United States Patent
Kasama

(10) Patent No.: US 9,291,452 B2
(45) Date of Patent: Mar. 22, 2016

(54) UNDULATION DETECTION DEVICE AND METHOD

(71) Applicant: FUJITSU LIMITED, Kawasaki-shi, Kanagawa (JP)

(72) Inventor: Kouichirou Kasama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 535 days.

(21) Appl. No.: 13/772,437

(22) Filed: Feb. 21, 2013

(65) Prior Publication Data

US 2013/0245997 A1 Sep. 19, 2013

(30) Foreign Application Priority Data

Mar. 16, 2012 (JP) ................. 2012-061038

(51) Int. Cl.
G01B 21/20 (2006.01)
G01B 15/08 (2006.01)

(52) U.S. Cl.
CPC ............... *G01B 21/20* (2013.01); *G01B 15/08* (2013.01)

(58) Field of Classification Search
CPC .... G01B 21/20; G01B 11/002; G01B 11/303; G01B 2290/70; G01B 9/02003; G01B 9/02018; G01B 9/02027; G01B 9/02061; G03F 7/70716; G03F 7/70775; G03F 9/7003
USPC .............. 702/32, 92, 97, 158, 166, 167, 170, 702/155, 159; 73/614; 250/201.4; 356/489
See application file for complete search history.

(56) References Cited

U.S. PATENT DOCUMENTS

| 5,061,071 A * | 10/1991 | Fujita .................. G01B 11/303 250/201.4 |
| 5,635,644 A * | 6/1997 | Ishikawa .............. G01B 17/025 73/614 |
| 2009/0069938 A1 | 3/2009 | Nishimura et al. |
| 2011/0057826 A1 | 3/2011 | Peng et al. |

FOREIGN PATENT DOCUMENTS

| JP | 03-179206 A | 8/1991 |
| JP | 04-104001 A | 4/1992 |
| JP | 08-338879 A | 12/1996 |
| JP | 09-033205 A | 2/1997 |
| JP | 09-292464 | 11/1997 |
| JP | 2000-221015 | 8/2000 |
| JP | 2006-295956 A | 10/2006 |
| JP | 2008-268224 | 11/2008 |
| JP | 2011-089980 A | 5/2011 |

OTHER PUBLICATIONS

JPOA, Office Action of Japanese Patent Application No. 2012-061038 dated Sep. 1, 2015 with Partial Translation.

* cited by examiner

*Primary Examiner* — John H Le
(74) *Attorney, Agent, or Firm* — Maschoff Brennan

(57) ABSTRACT

An undulation detection device includes a two-dimensional sensor configured to emit a sensing wave for distance measurement in a plurality of directions forming different lateral and vertical angles and to measure respective distances to objects from which the sensing wave is reflected, and a processor performs detecting an undulation of the measurement surface or an obstacle placed on the measurement surface from which the sensing wave is reflected, on the basis of a difference among the distances in the different directions, the difference being measured by the two-dimensional sensor, and outputting an undulation detection report, when an in-plane size of the undulation of the measurement surface or the obstacle placed on the measurement surface is equal to or more than a threshold.

12 Claims, 20 Drawing Sheets

FIG. 2

| | | \multicolumn{10}{c}{STEP NUMBER OF LATERAL ANGLE ($\phi$ DIRECTION)} |
|---|---|---|---|---|---|---|---|---|---|---|
| | | 0 | 1 | 2 | 3 | 4 | | $\phi$ | | n−1 | n |
| STEP NUMBER OF VERTICAL ANGLE ($\psi$ DIRECTION) | 0 | 0 | 1 | 0 | 0 | 0 | | 0 | | 1 | 0 |
| | 1 | 0 | 0 | 0 | 1 | 1 | | 0 | | 0 | 0 |
| | 2 | 0 | 1 | 0 | 0 | 1 | | 0 | | 0 | 0 |
| | 3 | 1 | 0 | 0 | 0 | 0 | | 0 | | 0 | 0 |
| | 4 | 0 | 0 | 0 | 0 | 0 | | 1 | | 1 | 0 |
| | $\psi$ | 0 | 1 | 0 | 1 | 0 | | 0 | | 1 | 0 |
| | m−1 | 0 | 1 | 0 | 0 | 0 | | 0 | | 0 | 0 |
| | m | 0 | 0 | 1 | 0 | 0 | | 0 | | 0 | 0 |

UNDULATION DATA AT MEASUREMENT POINT ($\psi$, $\phi$)

FIG. 3A

|     | i | i+1 | ... | j-1 | j |
|-----|---|-----|-----|-----|---|
| r   | 1 | 1   | 1   | 1   | 1 |
| r+1 | 1 | 1   | 1   | 1   | 1 |
| ⋮   | 1 | 1   | 1   | 1   | 1 |
| s-1 | 1 | 1   | 1   | 1   | 1 |
| s   | 1 | 1   | 1   | 1   | 1 |

FIG. 3B

|     | i | i+1 | ... | j-1 | j |
|-----|---|-----|-----|-----|---|
| r   | 1 | 1   | 1   | 1   | 1 |
| r+1 | 1 | 0   | 0   | 0   | 1 |
| ⋮   | 1 | 0   | 0   | 0   | 1 |
| s-1 | 1 | 0   | 0   | 0   | 1 |
| s   | 1 | 1   | 1   | 1   | 1 |

FIG. 12

| ATTITUDE ANGLE θ [DEG.] | CORRECTION COEFFICIENT CM1 FOR DEPTH THRESHOLD M | CORRECTION COEFFICIENT CN1 FOR WIDTH THRESHOLD N |
|---|---|---|
| 0 | 1.0 | 1.0 |
| 10 | 0.9 | 0.9 |
| 20 | 0.8 | 0.8 |
| ⋮ | ⋮ | ⋮ |
| 50 | 0.5 | 0.5 |
| 60 | 0.4 | 0.4 |

FIG. 15

| ATTITUDE ANGLE θ [DEG.] | CORRECTION COEFFICIENT CA WITHIN MEASUREMENT RANGE FOR FINE STEPS |
|---|---|
| 0 | 1.0 |
| 10 | 0.9 |
| 20 | 0.8 |
| ⋮ | ⋮ |
| 80 | 0.2 |
| 90 | 0.1 |

FIG. 18

| MEASUREMENT DISTANCE [cm] | CORRECTION COEFFICIENT CM2 FOR DEPTH THRESHOLD M | CORRECTION COEFFICIENT CN2 FOR WIDTH THRESHOLD N |
|---|---|---|
| 50 | 0.80 | 0.80 |
| 55 | 0.85 | 0.85 |
| ⋮ | ⋮ | ⋮ |
| 70 | 1.00 | 1.00 |
| ⋮ | ⋮ | ⋮ |
| 90 | 1.20 | 1.20 |
| 95 | 1.25 | 1.25 |

UNDULATION DETECTION DEVICE AND METHOD

CROSS-REFERENCE TO RELATED APPLICATION

This application is based upon and claims the benefit of priority of the prior Japanese Patent Application No. 2012-061038, filed on Mar. 16, 2012, the entire contents of which are incorporated herein by reference.

FIELD

The embodiments discussed herein are related to an undulation detection device and an undulation detection method which detect an undulation of a measurement surface by causing a two-dimensional sensor to emit a sensing wave for distance measurement in a plurality of directions forming different lateral and vertical angles and to measure distances to objects.

BACKGROUND

A device that detects unevenness of a side surface of a tire is an example of a known technique for measuring unevenness of an object surface. Such a device includes a pair of optical sensors and a determination unit. To be specific, the optical sensors are disposed so as to oppose the outer side of a tire rotatably supported by a shaft, and measure respective distances to the outer surface. The determination unit receives detection signals from the optical sensors, and determines that the tire is unsatisfactory when the distance to the outer surface of the tire varies beyond the reference range.

A measurement device, such as a scanning tunneling microscope, is known which measures unevenness of a material surface by performing a two-dimensional operation. This measurement device generates an inclined waveform of an object surface along the Z axis with respect to the X or Y axis for each scan along the X or Y axis, and determines a peak to peak value of the waveform. In addition, the measurement device A/D-converts the values of the inclined waveform through the amplifier. Further, the gain of the amplifier is optimized on the basis of the p-p value for the latest scan.

An unevenness measurement device is known which scans an object surface to be measured with a probe, while keeping the probe separated from the object surface so as not to be brought into contact with the surface. This unevenness measurement device measures a capacitance between the object surface and the probe, which is a predetermined distance away from the object surface, while scanning the object surface with the probe, and then, determines a distance between the probe and the object surface on the basis of the determined capacitance.

As for power consumption, an electronic device is known which has a configuration in which a processor circuit operates a built-in sensor intermittently and shuts down power to the sensor during an idle state.

An object detection device is known which includes: a detection unit that is capable of detecting a target in a specific direction; an operation control unit that operates the detection unit over a predetermined period; a variable operation-frequency unit that causes the operation control unit to decrease the operational period of the detection unit when the detection unit detects the target; and an output generation unit that outputs an alarm signal when the detection unit consecutively detects the target during the detection operation of the decreased period.

A technique is known for decreasing the power consumption in a micro-electromechanical system (MEMS) by setting the sampling frequency in a power-saving mode to be lower than that in a normal mode.

In the related art, neither a device nor a method is known which detects an undulation of a measurement surface by causing a two-dimensional sensor to emit a sensing wave for distance measurement in a plurality of directions forming different lateral and vertical angles and to measure distances to objects, and which notifies a user of detection of the undulation. For example, such a device and method are utilized to detect an undulation of the ground, road or floor around a user, and to notify the user that an obstacle is present thereon.

In the case of notifying a user of detection of an undulation, it is desirable to notify the user of only undulations equal to or more than an allowable level depending on the purpose of the device or method. If the detection sensitivity is excessively higher or lower than the user expects, the user may feel unsatisfied. For example, in the above example of notifying the user of the detection of an obstacle, the user may feel inconvenienced when notified of the detection of a relatively low or small undulation, because such an undulation is less likely to be an obstacle.

Japanese Laid-open Patent Publication Nos. 03-179206, 04-104001, 09-33205, 2006-295956, 08-338879, and 2011-89980 are examples of related art, in particular, the above-described techniques and devices.

SUMMARY

According to an aspect of the embodiments, an undulation detection device includes a two-dimensional sensor configured to emit a sensing wave for distance measurement in a plurality of directions forming different lateral and vertical angles and to measure respective distances to objects from which the sensing wave is reflected, and a processor performs, detecting an undulation of the measurement surface or an obstacle placed on the measurement surface from which the sensing wave is reflected, on the basis of a difference among the distances in the different directions, the difference being measured by the two-dimensional sensor, and outputting an undulation detection report, when an in-plane size of the undulation of the measurement surface or the obstacle placed on the measurement surface is equal to or more than a threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an explanatory view depicting an example of undulation data;

FIG. 3A is an explanatory view depicting a first example of a process of determining a size of an undulation;

FIG. 3B is an explanatory view depicting a second example of a process of determining a size of an undulation;

FIG. 12 is an explanatory view depicting a first example of correcting the size threshold;

FIG. 15 is an explanatory view depicting an example of correcting an angle range in which distance measurement is made in fine steps;

FIG. 18 is an explanatory view depicting a second example of correcting the size threshold;

DESCRIPTION OF EMBODIMENTS

First Embodiment

1.1. Method of Detecting Undulation

Figure 1:
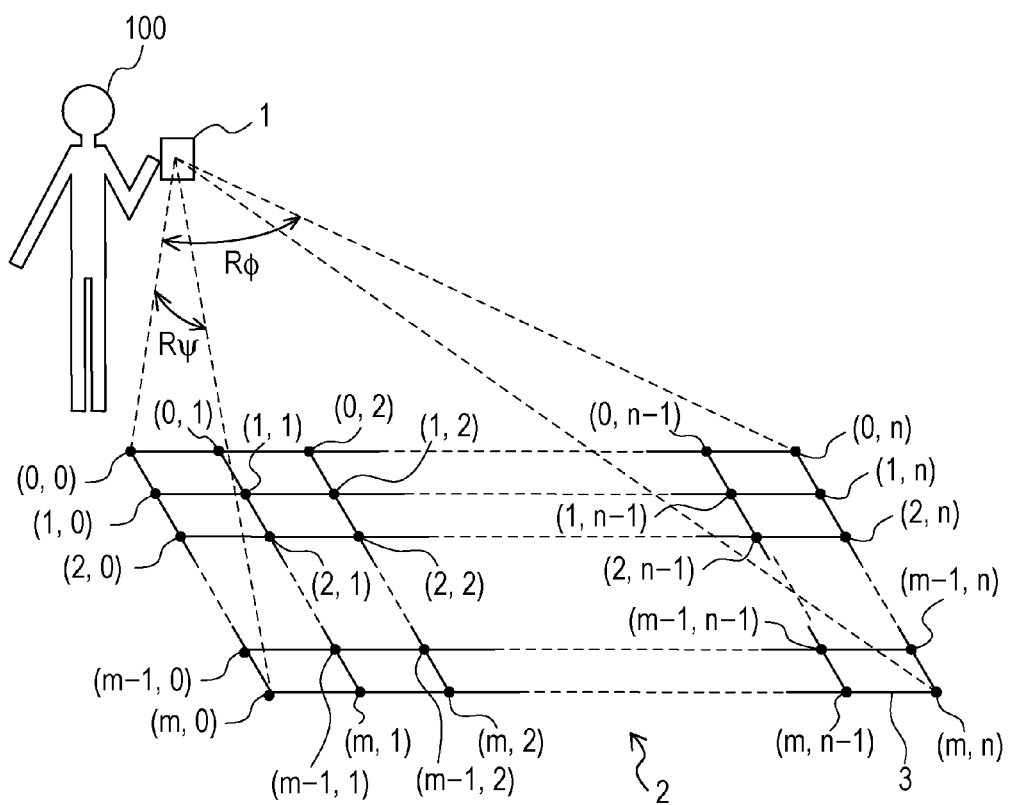
FIG. 1 is an explanatory view depicting a first example of an undulation detection process.

Hereinafter, a preferred embodiment will be described with reference to the accompanying drawings. FIG. 1 is an explanatory view depicting a first example of an undulation detection method. In FIG. 1, a reference numeral 1 denotes an electronic device that detects an undulation of a measurement surface 2, and a reference numeral 100 denotes a user who is holding the electronic device 1. An example of the measurement surface 2 is the ground, road or floor on which the user 100 is standing. The electronic device 1 emits a sensing wave for distance measurement in a plurality of directions forming different lateral and vertical angles. An example of the sensing wave is a millimeter wave or an ultrasonic wave.

The sensing waves that have been emitted in a plurality of directions travel obliquely downward, and then is reflected by the measurement surface 2, finally returning to the electronic device 1. The lateral directions in which sensing waves are emitted are varied in "0" to "n" steps, whereas the vertical directions are varied in "0" to "m" steps. In FIG. 1, points (0, 0), (1, 0) . . . (m, n) denote points at which the sensing waves having been emitted in the plurality of directions are reflected by the measurement surface 2.

The electronic device 1 detects the returned sensing waves, and measures a distance between the electronic device 1 and each of the points (0, 0) to (m, n). It is to be noted that in the following description, the points (0, 0) to (m, n) at which the sensing waves are reflected by the measurement surface 2 will be referred to as "measurement points" as appropriate.

A lateral variable range of angles over which the sensing waves are emitted is denoted by RΦ), whereas a vertical variable range of angles is denoted by RΨ. A distance measurement region 3 is schematically depicted as a region in which a distance to the measurement surface 2 is measured. The electronic device 1 detects an undulation between two measurement points, on the basis of a difference between the respective measured distances to the measurement points. For example, it is assumed that a point at which an undulation is to be detected is a target point, and any one of the measurement points (0, 0), (1, 0) . . . (m, n) is a reference point. Further, if a difference between respective distances to the target and reference points is equal to or more than a threshold, the electronic device 1 determines that an undulation is present therebetween. Alternately, it is assumed that a difference between respective distances to the target point and the reference point is calculated under the condition of the measurement surface 2 being flat (calculated distance), and the difference therebetween is measured (measured distance). Further, if a difference between the calculated and measured differences is equal to or more than a threshold, the electronic device 1 may determine that an undulation is present between the target and reference points.

A reference point may be set and fixed at any one of the measurement points (0, 0), (1, 0) . . . (m, n). In this case, the electronic device 1 calculates a difference between respective distances to the single reference point and each of multiple measurement points. For example, the measurement point (0, 0) may be used as a reference point. Alternatively, a reference point may be changed in accordance with a target point. Specifically, a measurement point located adjacent to a target point may be used as a reference point for the target point.

The electronic device 1 creates undulation data for each measurement point which indicates whether an undulation is present or not between the target point and the reference point. FIG. 2 is an explanatory view depicting an example of undulation data. In the data table, the heading in the top row indicates step numbers of lateral angles at which sensing waves are transmitted to the measurement points. In addition, the heading in the left column indicates step numbers of vertical angles at which sensing waves are transmitted to the measurement points. In the data table, for example, undulation data for Step φ of the lateral angle and Step ψ, of the vertical angle indicates whether an undulation is present or not between the measurement point (ψ, φ) and the reference point. To be specific, undulation data becomes "1" when an undulation is present between the target and reference points, whereas the undulation data becomes "0" when an undulation is absent therebetween.

In the data table of FIG. 2, undulation data for Step 3 of the lateral angle and Step 1 of the vertical angle is "1". Therefore, it is evident from this data that an undulation is present between the measurement point (1, 3) and the reference point. In addition, undulation data is "0" in Step 2 of the lateral angle and Step 3 of the vertical angle. Therefore, it is evident from this data that an undulation is absent between the measurement point (3, 2) and the reference point.

The electronic device 1 determines an in-plane size of an undulation of the measurement surface 2, on the basis of the undulation data. For example, the in-plane size of an undulation may be the area of the undulation of the measurement surface 2. Alternatively, the in-plane size of an undulation may be the depth and width of the undulation of the measurement surface 2, or respective lengths thereof in the lengthwise and width direction.

FIG. 3A is an explanatory view depicting a first example of a process of determining a size of an undulation. Specifically, FIG. 3A depicts an example of undulation data in the case where when a difference between distances to a fixed reference point and one of target points is equal to or more than a threshold, the electronic device 1 determines that an undulation is present between the target and reference points. The above example is also applicable to the case where when a calculated difference between distances to a fixed reference point and one of target points is different from a measured difference therebetween by an amount equal to or more than a threshold, the electronic device 1 determines that an undulation is present between the target and reference points.

It is assumed that a single continuous projection or depression is present across multiple measurement points. In this case, at measurement points arranged within the area of the projection or depression, all the pieces of the undulation data become "1." In the example of FIG. 3A, within a range defined by Steps i to j of the lateral angle and Steps r to s of the vertical angle, all the pieces of undulation data are continuously "1." Therefore, it is obvious that a single continuous projection or depression is present within a region enclosed by measurement points (r, i) to (r, j), (r, i) to (s, j), (s, i) to (s, j), and (r, i) to (s, i). In addition, the electronic device 1 determines an in-plane size of an undulation, on the basis of the number of measurement points at which the respective pieces of undulation data are continuously "1."

FIG. 3B is an explanatory view depicting a second example of a process of determining a size of an undulation. Specifically, FIG. 3B depicts an example of undulation data in the case where a neighboring point of a target point is used as a reference point for the target point. In this example, respective distances to a target point and a reference point differ from each other at an edge of a projection or depression. Accordingly, at the edge of a projection or depression, pieces of undulation data become "1."

In the example of FIG. 3B, the pieces of undulation data are continuously "1" at the edge of a region defined by Steps i to j in the lateral angle and Steps r to s in the vertical angle. It is evident from this data that a projection or depression is present within a region enclosed by measurement points (r, i) to (r, j), (r, i) to (s, j), (s, i) to (s, j), and (r, i) to (s, i). In addition, the electronic device 1 determines an in-plane size of an undulation, on the basis of the number of measurement points within a region enclosed by the pieces of undulation data of "1."

Figure 4:
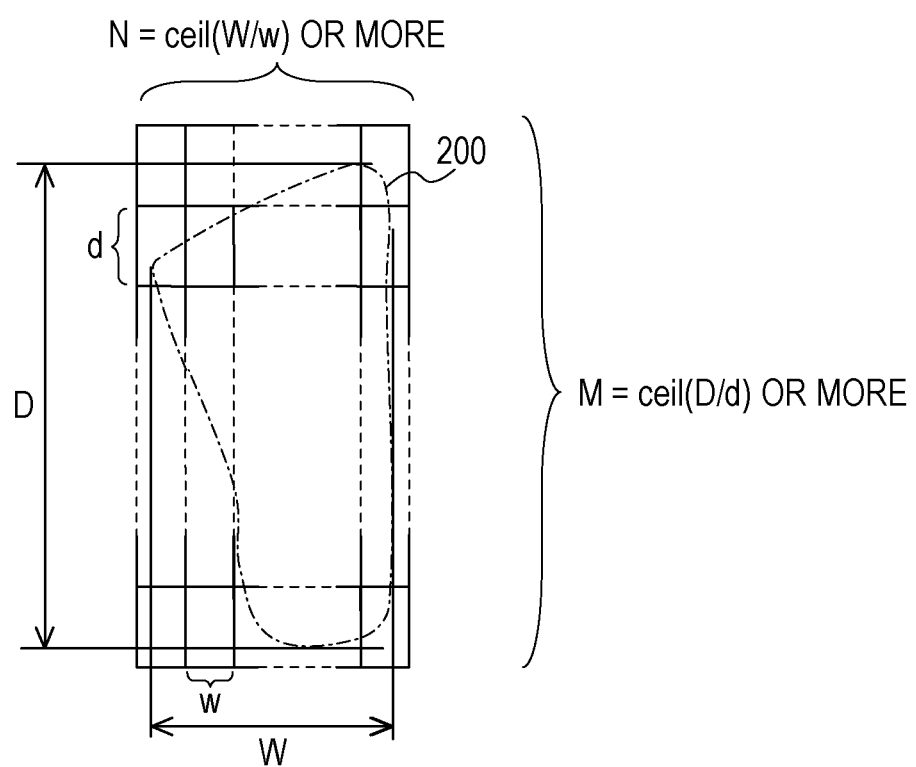
FIG. 4 is an explanatory view depicting an example of a size threshold.

The electronic device 1 determines whether or not the in-plane size of the determined undulation is equal to or more than a threshold, and then, outputs an undulation detection report to the user 100 when the in-plane size is equal to or more than the threshold. FIG. 4 is an explanatory view depicting an example of a size threshold. In the first embodiment, the size threshold includes a depth threshold M and a width threshold N. For example, in the case of detecting an undulation whose in-plane size is larger than a foot size of the user 100, the thresholds M and N have to be set in accordance with the foot size of the user 100.

In FIG. 4, a dashed line 200 represents the shape of the foot of the user 100. The depth and width of the foot are denoted by D and W, respectively, and respective intervals between adjacent measurement points along the depth and width are denoted by d and w. It is to be noted that the intervals d and w are varied depending on a height of the electronic device 1 held by the user 100 or an attitude of the electronic device 1. Therefore, it is desirable that intervals d and w at a reference height of the electronic device 1 and in a reference attitude thereof be used as reference intervals d and w, respectively.

The depth threshold M is set equal to or more than a value satisfying a relationship M=ceil(D/d), and the width threshold N is set equal to or more than a value satisfying a relationship N=ceil(W/w). The function "ceil(x)" is a ceiling function giving a minimal integer of x or more. The user 100 may enter designated values for the thresholds M and N or the foot sizes D and W in the electronic device 1. If the electronic device 1 is equipped with an image pickup device, the electronic device 1 may estimate the sizes D and W of the foot, on the basis of a captured image of the foot of the user 100 and a distance to the foot upon capturing the image.

When within an undulation, the number of measurement points is equal to or more than the depth threshold M in the depth direction and the number of measurement points is equal to or more than the width threshold N in the width direction, the electronic device 1 outputs an undulation detection report to the user 100. Alternatively, when within an undulation, the number of measurement points is equal to or more than the depth threshold M in the depth direction or when the number of measurement points is equal to or more than the width threshold N in the width direction, the electronic device 1 may output an undulation detection report to the user 100.

1.2. First Example of Hardware Configuration of Electronic Device

Next, a configuration of the electronic device 1 will be described. The electronic device 1 is implemented using, for example, a portable electronic device that a user is carrying. Specifically, the electronic device 1 may be implemented using a portable information terminal, a mobile phone, a portable music player, a game device, a mobile personal computer, a digital still camera, a digital video camera, a portable TV, or a portable navigation system.

Figure 5:
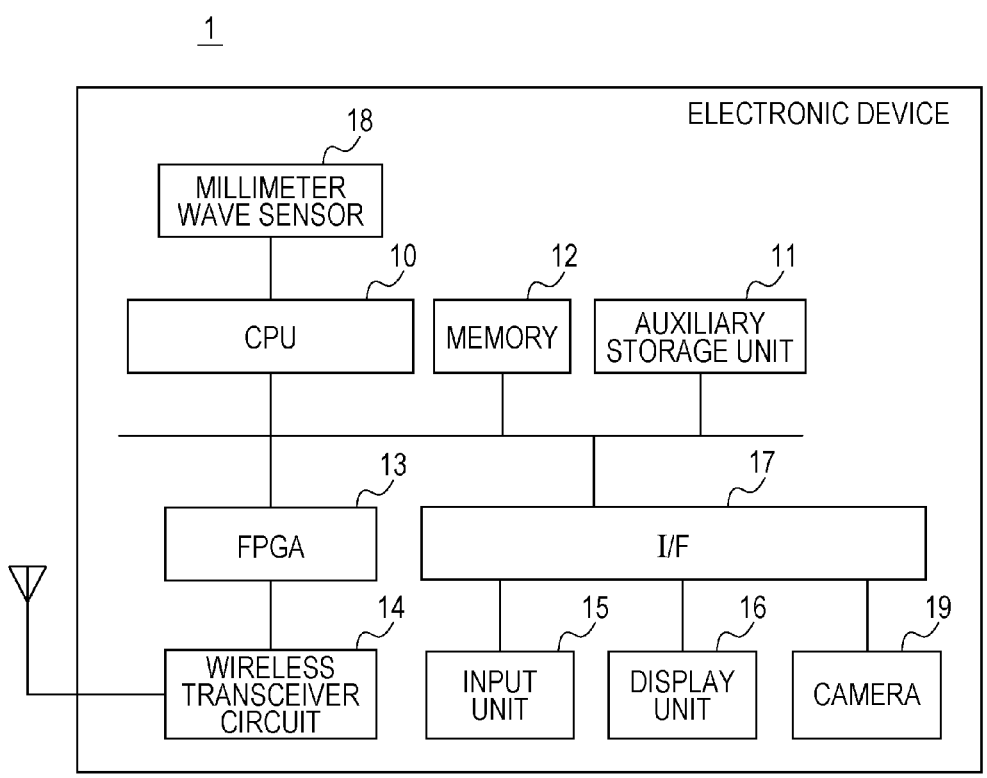
FIG. 5 is a block diagram depicting a first example of a hardware configuration in an electronic device.

FIG. 5 is a block diagram depicting a first example of a hardware configuration in the electronic device 1. The hardware configuration illustrated in FIG. 5 is an example of a hardware configuration implementing the electronic device 1. It is to be noted that there is no limitation on a hardware configuration of the electronic device 1, and any hardware configuration may be employed as long as the electronic device 1 performs an undulation detection process as will be described hereinafter. Obviously, the above note also applies to a second example of the hardware configuration illustrated in FIG. 9.

As illustrated in FIG. 5, the electronic device 1 includes a CPU (central processing unit) 10, an auxiliary storage unit 11, a memory 12, an FPGA (field-programming gate array) 13, a wireless transceiver circuit 14, an input unit 15, a display unit 16, an interface unit 17, a millimeter wave sensor 18, and a camera 19. Here, the interface unit is denoted by "I/F" in FIG. 5.

The CPU 10 executes a computer program stored in the auxiliary storage unit 11, thereby performing information for processing application software operated by a user of the electronic device 1. An example of the computer programs executed by the CPU 10 is an electric mail, a web browser, a game, a video replay program, or a capturing program controlling the operation of the camera 19.

The CPU 10 executes a computer program stored in the auxiliary storage unit 11, thereby performing the undulation detection process that will be described hereinafter. The auxiliary storage unit 11 includes a nonvolatile memory unit storing the computer programs and data used to execute the computer programs. An example of the nonvolatile memory unit is a flash memory, a hard disk, or a ROM (read only memory).

The memory 12 stores data and temporary data used when the CPU 10 executes a computer program. Examples of the memory 12 may include a RAM (random access memory). The FPGA 13 applies baseband signal processing to signals which the wireless transceiver circuit 14 transmits/receives during the wireless communications. If the electronic device 1 is a mobile station device, the FPGA 13 may apply baseband signal processing to signals which the mobile station device transmits/receives to or from a base station device during the wireless communications. Alternatively, the electronic device 1 may include a DSP (digital signal processor) that performs the baseband signal processing, and a memory that stores a firmware executed by the DSP, in place of the FPGA 13. In addition, the electronic device 1 may include an LSI (large scale integration) circuit, ASIC (application specific integrated circuit), or any other suitable logic circuit performing the baseband signal processing, in place of the FPGA 13.

The input unit 15 is a user interface unit that receives an input operation that a user enters in the electronic device 1. The input unit 15 is provided with, for example, a numeric keypad for use in inputting phone numbers, cursor keys, or dedicated keys for use in performing specific operations. Furthermore, the input unit 15 may be provided with a touch panel. The display unit 16 displays thereon a user interface of application software executed by the CPU 10. In addition, the display unit 16 displays an undulation detection report that the CPU 10 has outputted as a result of the undulation detection process. The interface unit 17 processes signals inputted to the CPU 10 from each of the input unit 15, the camera 19 and the display unit 16 and outputted from the CPU 10 to each of the input unit 15, the camera 19 and the display unit 16.

The millimeter wave sensor 18, which is implemented using a two-dimensional sensor, transmits a millimeter wave to objects present in different vertical and lateral directions while changing the lateral and vertical output angles of the millimeter wave. As a result, the millimeter wave sensor 18 scans distances to the objects with the millimeter wave. The millimeter wave sensor 18 detects the millimeter waves reflected from the objects, and measures respective distances to the objects, on the basis of a time period taken for the millimeter wave to reach the objects. Alternatively, the electronic device 1 may be provided with a near infrared array sensor as a two-dimensional sensor, in place of or in addition to the millimeter wave sensor 18.

1.3. First Example of Functional Configuration of Electronic Device

Figure 6:
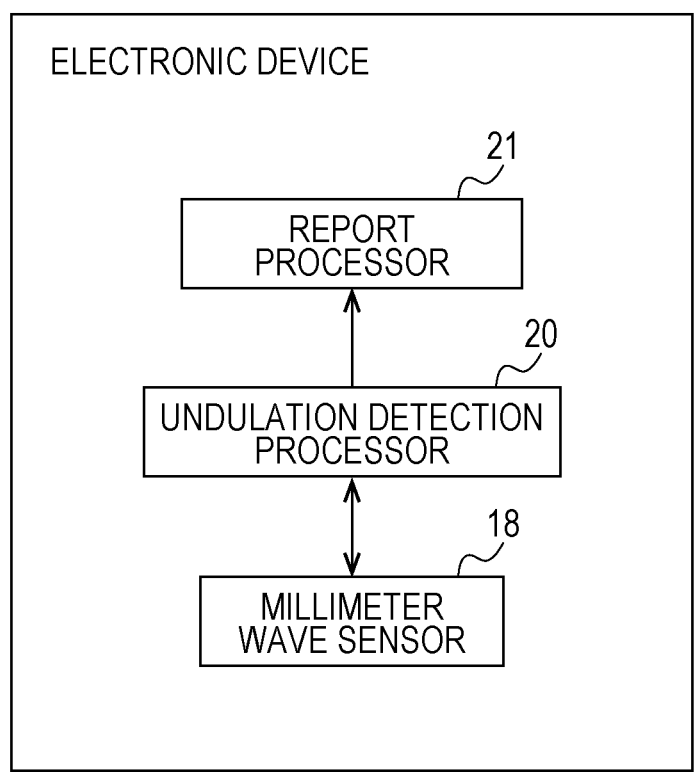
FIG. 6 is a block diagram depicting a first example of a functional configuration of the electronic device.

Next, a description will be given of a function of the electronic device 1 which is implemented using the above hardware configuration. FIG. 6 is a block diagram depicting a first example of a functional configuration of the electronic device 1. The electronic device 1 includes a millimeter wave sensor 18, an undulation detection processor 20, and a report processor 21. The undulation detection processor 20 and the report processor 21 are operated by the CPU 10 illustrated in FIG. 5. It is to be noted that in FIG. 6, the functional components related to the following description are mainly illustrated. Accordingly, the electronic device 1 may include any other functional component. This note also applies to a second example of the functional block illustrated in FIG. 10.

The undulation detection processor 20 creates undulation data, such as that illustrated in FIG. 2, on the basis of a measurement result of the millimeter wave sensor 18. Then, the undulation detection processor 20 determines an in-plane size of an undulation within each distance measurement region 3 of the measurement surface 2, on the basis of the undulation data. If the in-plane size of the undulation is equal to or more than a threshold, the report processor 21 outputs an undulation detection report notifying a user of the detection of the undulation to the display unit 16. The undulation detection report may contain, for example, a direction in which the undulation is present, a distance to the undulation, a height or depth of the undulation, and/or the in-plane size of the undulation.

Figure 7:
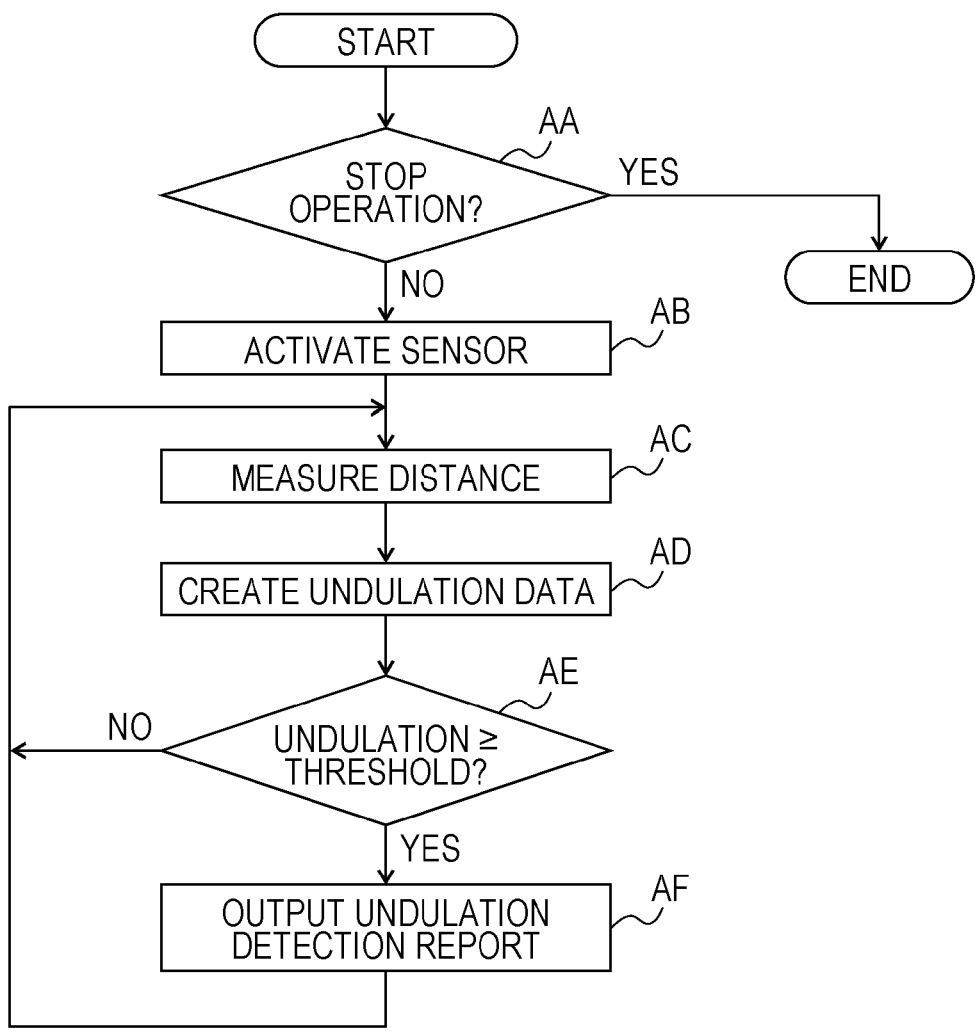
FIG. 7 is a flowchart depicting a first example of the undulation detection process performed by the electronic device.

1.4. First Example of Undulation Detection Process Performed by Electronic Device FIG. 7 is a flowchart depicting a first example of the undulation detection process performed by the electronic device 1. It is to be noted that sequential operations that will be described below with reference to FIG. 7 may be interpreted as a method involving a plurality of procedures. In this case, an "operation" may be replaced by a "step." This note also applies to flowcharts of FIGS. 13, 16, 19 and 20.

In Operation AA, the undulation detection processor 20 determines whether or not the input unit 15 has received a stop operation for the electronic device 1 from a user. If the input unit 15 has received the stop operation ("Y" in Operation AA), the undulation detection processor 20 terminates the process. Otherwise, if the input unit 15 has not received the stop operation ("N" in Operation AA), the process proceeds to an operation AB.

In Operation AB, the undulation detection processor 20 activates the millimeter wave sensor 18. In Operation AC, the millimeter wave sensor 18 measures respective travel distances to the measurement surface 2 in a plurality of directions forming different lateral and vertical angles which a millimeter wave has reached. In Operation AD, the undulation detection processor 20 creates undulation data.

In Operation AE, the undulation detection processor 20 determines in-plane size of an undulation within each distance measurement region 3, on the basis of the undulation data. Then, the undulation detection processor 20 determines whether or not the in-plane size of the undulation is equal to or more than a threshold. If the in-plane size of the undulation is equal to or more than the threshold ("Y" in Operation AE), the process proceeds to Operation AF. Otherwise, if the in-plane size of the undulation are not equal to or more than the threshold ("N" in Operation AE), the process returns to Operation AC. In Operation AF, the report processor 21 outputs an undulation detection report to the display unit 16. Then, the process returns to Operation AC.

1.5. Advantageous Effect

With the first embodiment, a user is notified of, by the electronic device 1, only an undulation equal to or more than an allowable level depending on the purpose of the electronic device 1, so that the disadvantage caused due to the insufficient detection sensibility is reduced. Furthermore, a user is also notified of a direction in which an undulation is present and a size and/or height or depression of this undulation.

The millimeter wave sensor 18 may make the measurement intermittently. For example, in the case where a distance measurement region 3 has a depth of 5 meters to 10 meters, the millimeter wave sensor 18 may make the measurement simply at intervals of 1 second to 2 seconds. With this intermittent measurement made by the millimeter wave sensor 18, the power consumption of the electronic device 1 is decreased.

2. Second Embodiment

Figure 8A:
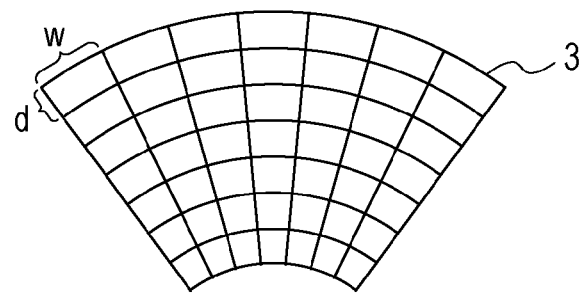
FIGS. 8A and 8B are explanatory views depicting a fact that an interval between measurement points is varied depending on an attitude angle of the electronic device.
Figure 8A:
Figure 8B:
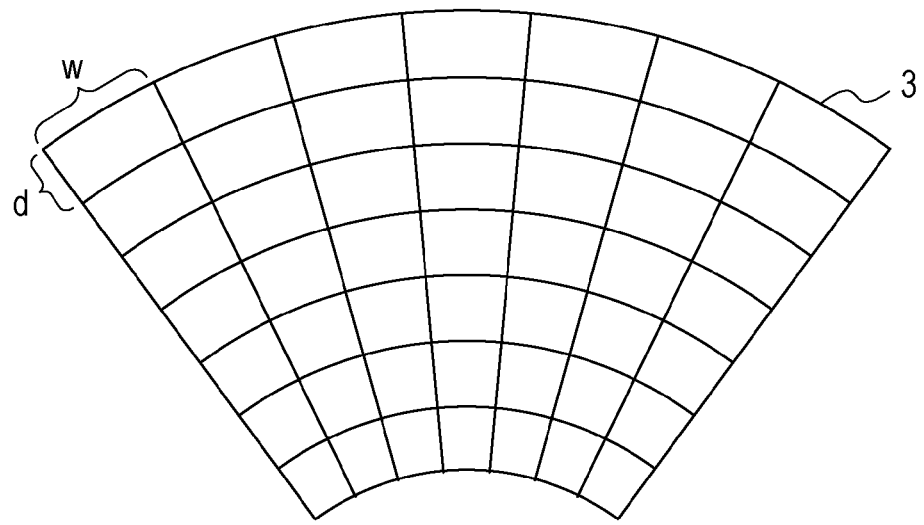
Figure 8B:

Next, another embodiment will be described. As illustrated in FIG. 1, the electronic device 1 emits a sensing wave toward the measurement surface 2 obliquely. Accordingly, an interval between each adjacent pair of measurement points at which the sensing wave is reflected by the measurement surface 2 is varied depending on an attitude angle of the electronic device 1. FIGS. 8A and 8B are schematic views depicting a variation in an interval between measurement points, depending on different attitude angles. In the case of FIG. 8A, variable ranges $R\Phi$ and $R\Psi$ of lateral and vertical angles, respectively, over which the sensing waves are emitted are as wide as those in the case of FIG. 8B. However, the vertical angles of the sensing wave in the case of FIG. 8B are closer to 0 degrees than corresponding angles the case of FIG. 8A.

As a result, the sensing wave in the case of FIG. 8B reaches farther points on the measurement surface 2 than those in the case of FIG. 8A does, so that each distance measurement region 3 of FIG. 8B becomes larger than that of FIG. 8A. In addition, intervals d and w in the case of FIG. 8B also become longer than intervals d and w, respectively, in the case of FIG. 8A. As described above, the electronic device 1 outputs an undulation detection report, when the number of measurement points within an undulation is equal to or more than a threshold. Therefore, as the intervals d and w between adjacent measurement points increase, a lower limit of an undulation size at which the undulation detection report is outputted increases. For this reason, in the second embodiment, the electronic device 1 measures an attitude angle thereof, and corrects a depth threshold M and a width threshold N in accordance with the measured attitude angle.

Figure 9:
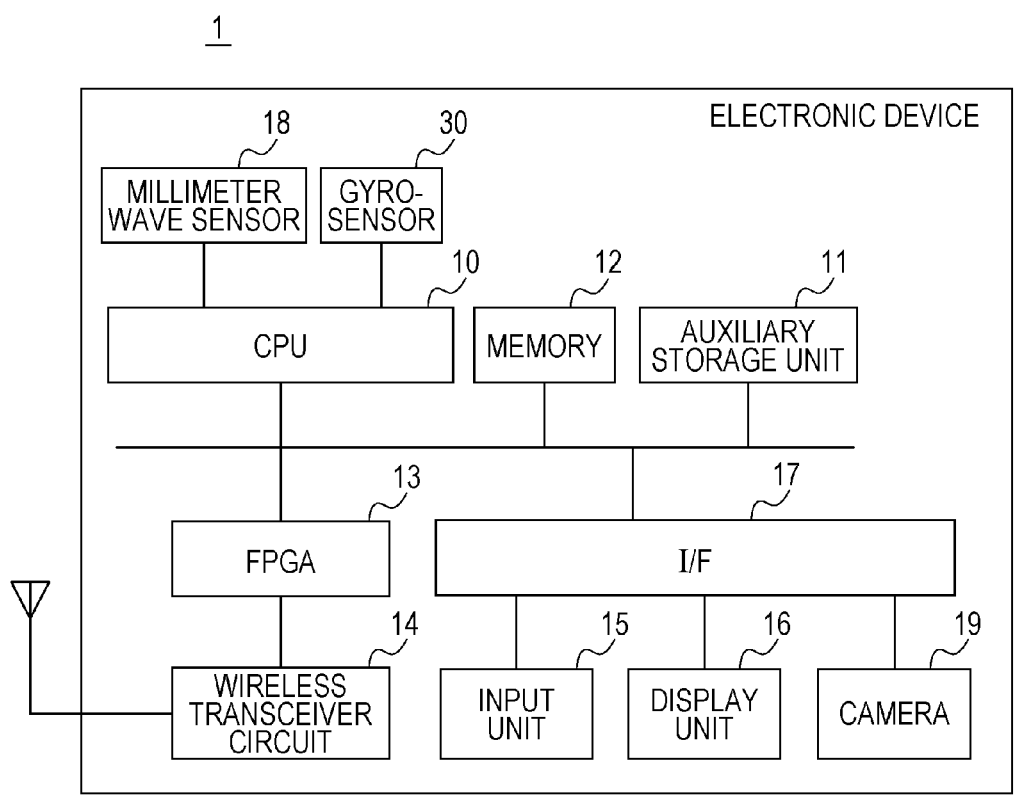
FIG. 9 is a block diagram depicting a second example of the hardware configuration in the electronic device.
Figure 10:
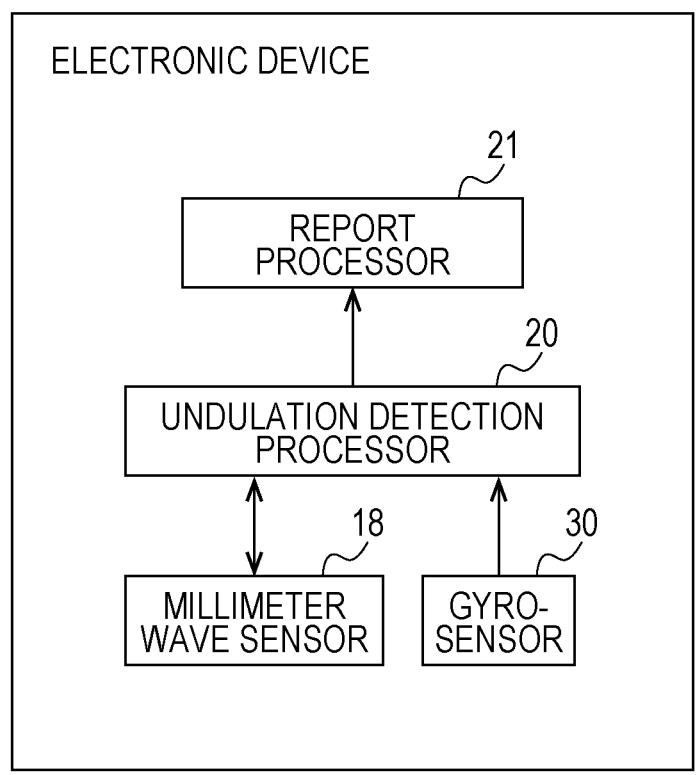
FIG. 10 is a block diagram depicting a second example of the functional configuration of the electronic device.

2.1. Second Example of Hardware and Functional Configurations of Electronic Device FIG. 9 is a block diagram depicting a second example of the hardware configuration in the electronic device 1. In FIG. 9, the same reference numerals are given to components that are the same as those of FIG. 5. Furthermore, an explanation of the operations of the components that are the same as those having been described with reference to FIG. 5 will be omitted. FIG. 10 is a block diagram depicting a second example of the functional configuration of the electronic device 1. In FIG. 10, the same reference numbers are given to components that are the same as those of FIG. 6. Furthermore, an explanation of the operations of the components that are the same as those having been described with reference to FIG. 6 will be omitted.

The electronic device 1 is provided with a gyro-sensor 30 measuring an attitude angle $\Theta$ of the electronic device 1. Furthermore, the electronic device 1 may be provided with another sensor that measures an attitude angle $\Theta$ of the electronic device 1, in place of or in addition to the gyro-sensor 30. Specifically, the electronic device 1 may be provided with an acceleration sensor that measures an attitude angle $\Theta$ of the electronic device 1 on the basis of the gravity direction.

Figure 11:
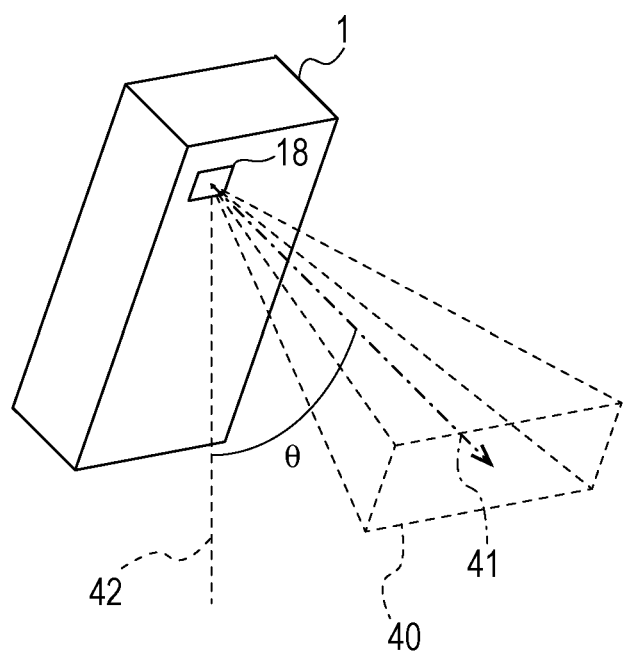
FIG. 11 is an explanation view depicting an example of a process of measuring an attitude angle of the electronic device.

FIG. 11 is an explanation view depicting an example of a process of measuring an attitude angle $\Theta$ of the electronic device 1. In FIG. 11, a reference numeral 40 denotes a spatial region defined by variable ranges $R\Phi$ and $R\Psi$ of lateral and vertical angles, respectively, over which the millimeter wave sensor 18 emits millimeter waves, and a reference numeral 41 denotes a central axis of the spatial region. The gyro-sensor 30 detects an angle between the central axis 41 and a perpendicular direction 42, as an attitude angle $\Theta$ of the electronic device 1.

FIG. 12 is an explanatory view depicting a first example of correcting depth and width thresholds. In the electronic device 1, correction coefficients CM1 and CN1 are preset in order to correct a depth threshold M and a width threshold N, respectively, in accordance with an attitude angle $\Theta$ of the electronic device 1. In FIG. 12, the correction coefficient CM1 is 1.0, 0.9, 0.8 . . . 0.5 and 0.4, respectively, when an attitude angle is 0, 10, 20 . . . 50 and 60 degrees. The correction coefficient CN1 is also set in the similar manner.

The correction coefficients CM1 and CN1 are stored in the auxiliary storage unit 11. The undulation detection processor 20 selects depth and width correction coefficients CM1 and CN1 in accordance with an attitude angle $\Theta$ measured by the gyro-sensor 30. The undulation detection processor 20 corrects a depth threshold M and a width threshold N by multiplying the thresholds M and N by the selected correction coefficients CM1 and CN1, respectively.

Figure 13:
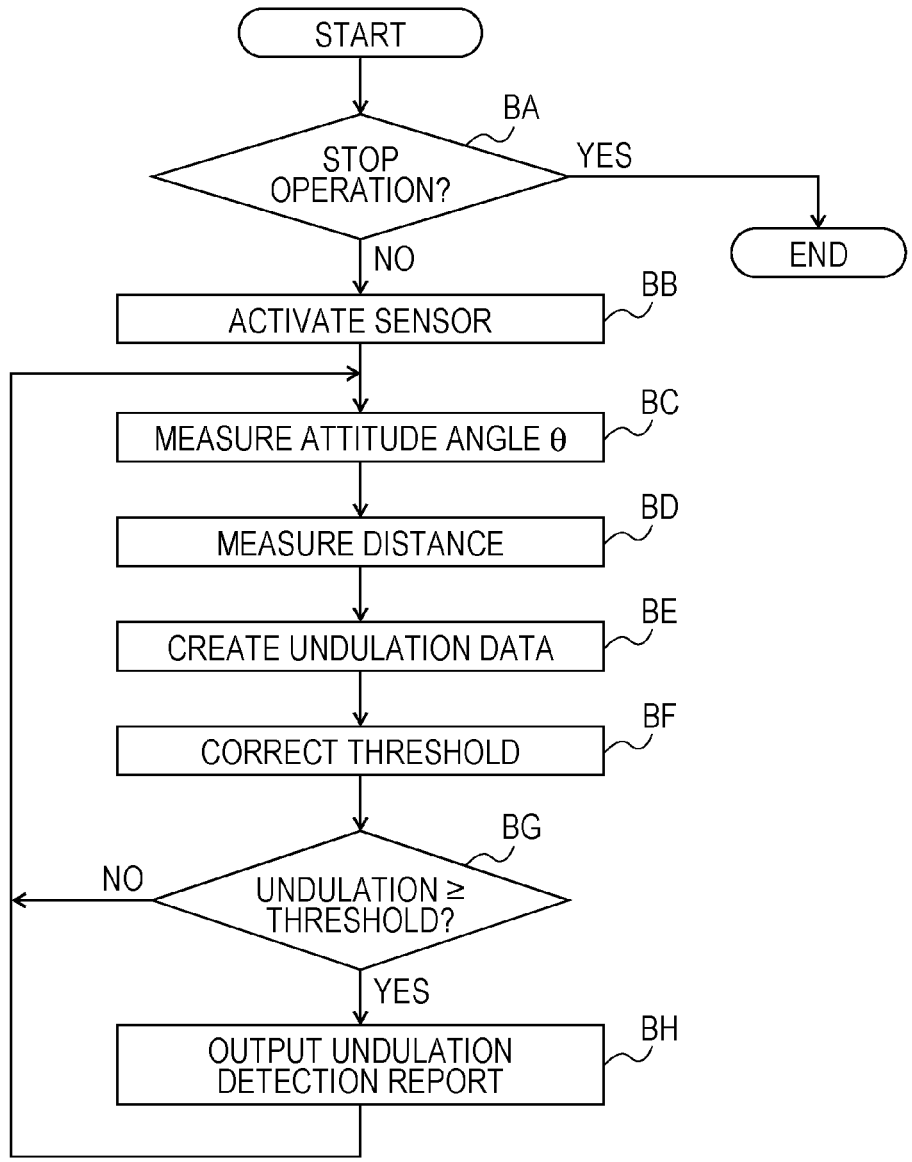
FIG. 13 is a flowchart depicting a second example of the undulation detection process performed by the electronic device.

2.2. Second Example of Undulation Detection Process Performed by Electronic Device FIG. 13 is a flowchart depicting a second example of the undulation detection process performed by the electronic device 1. In the flowchart of FIG. 13, Operations BA and BB are the same as Operations AA and AB, respectively, in the flowchart of FIG. 7. At Operation BC, the gyro-sensor 30 measures an attitude angle $\Theta$ of the electronic device 1. Operations BD and BE are the same as Operations AC and AD, respectively, in the flowchart of FIG. 7.

In Operation BF, the undulation detection processor 20 selects correction coefficients CM1 and CN1 in accordance with the attitude angle $\Theta$ measured by the gyro-sensor 30. The undulation detection processor 20 corrects the thresholds M and N by using the selected correction coefficients. Operations BG and BH are the same as Operations AE and AF, respectively, in the flowchart of FIG. 7.

2.3. Advantageous Effect

With the second embodiment, a lower limit of an undulation size at which the undulation detection report is outputted is made less dependent on the attitude angle $\Theta$ of the electronic device 1. This configuration enables the electronic device 1 to accurately detect only an undulation equal to or more than an allowable level depending on the purpose of the electronic device 1. It is to be noted that the second embodiment may be performed in conjunction with one or more of third to fifth embodiments that will be described hereinafter.

3. Third Embodiment

Next, another embodiment will be described. As described in "2. Second Embodiment," the scale of a distance measurement region 3 is dependence on the attitude angle $\Theta$ of the electronic device 1. If the electronic device 1 makes distance measurement within an excessively large area uniformly, the power of the electronic device 1 is consumed unnecessarily. Accordingly, in the third embodiment, the electronic device 1 divides the measurement region 3 into a plurality of measurement regions in which the emission angles of millimeter waves are varied in different steps. Further, the electronic device 1 expands or shrinks a measurement region in which the emission angles of millimeter waves are varied in fine steps, in accordance with an attitude angle Θ of the electronic device 1. For example, as the attitude angle Θ increases, a measurement region in which the emission angles of millimeter waves are varied in fine steps may be shrunk.

Figure 14A:
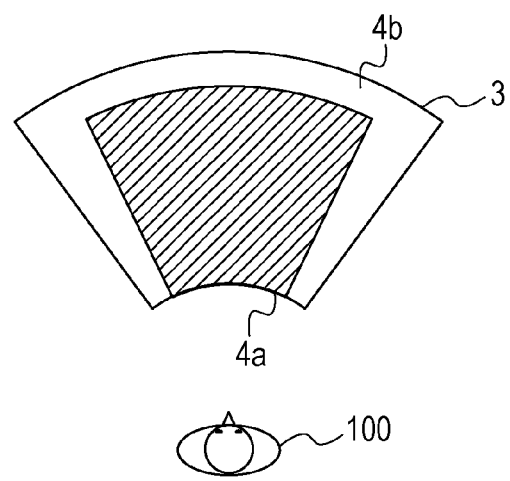
FIGS. 14A and 14B are explanatory views depicting an example of a process of changing a size of a measurement region in which the emission angles of a millimeter wave are varied in fine steps, in accordance with an attitude angle of the electronic device.
Figure 14B:
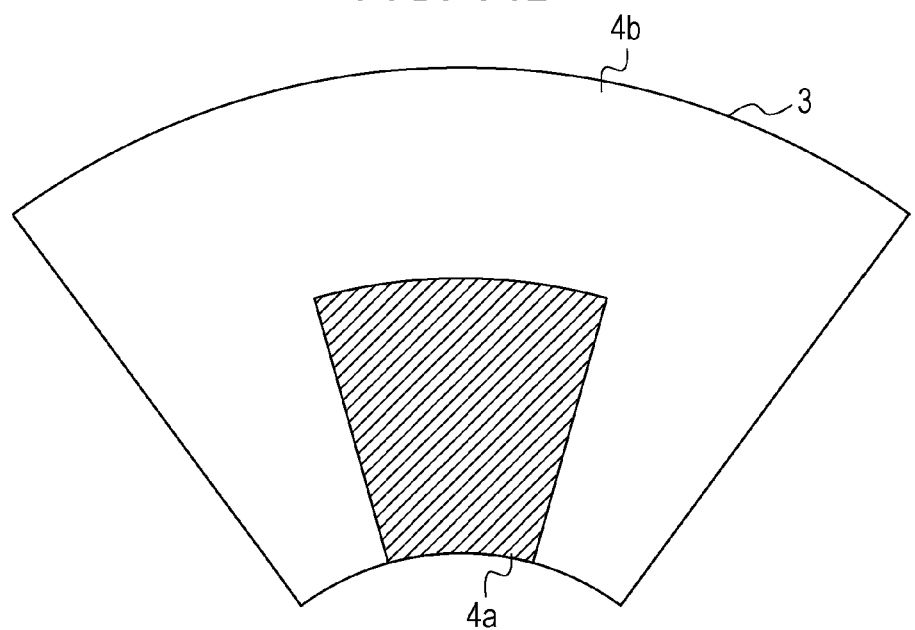

FIGS. 14A and 14B are explanatory views depicting an example of a process of changing a size of a measurement region in which the emission angles of millimeter waves are varied in fine steps, in accordance with an attitude angle Θ. In the case of FIG. 14B, variable ranges RΦ and RΨ of lateral and vertical angles over which sensing waves are emitted are as wide as those in the case of FIG. 14A, respectively. However, the vertical angles of the sensing waves in FIG. 14B are closer to 0 degrees than corresponding angles in FIG. 14A. In this case, a distance measurement region 3 of FIG. 14B becomes larger than that of FIG. 14A.

In FIGS. 14A and 14B, a reference numeral 4a denotes a first measurement region in which the emission angles of millimeter waves are varied in fine steps. In addition, a reference numeral 4b denotes a second measurement region in which the emission angles of millimeter waves are varied in rough steps. For example, a variable angle step in the second measurement range may be four times as wide as that in the first measurement range. In the case of FIG. 14B, because the attitude angle Θ is larger than that in the case of FIG. 14A, the electronic device 1 shrinks a measurement region in which the emission angles of millimeter waves are varied in fine steps. As a result, the ratio of the first measurement region to the distance measurement region 3 decreases.

When the first measurement region is shrunk in the width direction, the electronic device 1 sets the lateral variable angle steps so as to gradually become narrower from the sides of the lateral variable angle range toward the center thereof. Meanwhile, when the first measurement region is shrunk in the depth direction, the electronic device 1 sets the vertical variable angle steps so as to gradually become narrower from the upper side of the vertical variable angle range toward the lower side thereof. By setting the variable angle steps in this manner, the distance measurement is made in fine steps within a region close to the user, so that the detection accuracy is maintained.

FIG. 15 is an explanatory view depicting an example of correcting a range in which distance measurement is made in fine steps. The electronic device 1 presets a correction coefficient CA for a range over which distance measurement is made in fine steps, in accordance with an attitude angle Θ. In FIG. 15, the correction coefficient CA is 1.0, 0.9, 0.8 . . . 0.2 and 0.1, respectively, when an attitude angle is 0, 10, 20 . . . 80 and 90 degrees.

The correction coefficients CA are stored in the auxiliary storage unit 11. The undulation detection processor 20 selects a proper correction coefficient CA in accordance with an attitude angle Θ measured by the gyro-sensor 30. The undulation detection processor 20 determines respective ranges over which the lateral and vertical emission angles of millimeter waves are varied in fine steps, by multiplying the variable angle ranges RΦ and RΨ by the correction coefficient CA. The undulation detection processor 20 drives the millimeter wave sensor 18 so as to emit millimeter waves in fine angle steps within a determined variable angle range and in rough angle steps outside the determined variable angle range.

Alternatively, instead of or in addition to changing the variable ranges in which the emission angles of millimeter waves are varied in fine steps in accordance with the attitude angle Θ, the electronic device 1 may vary the transmission range RΦ and/or the transmission range RΨ in accordance with the attitude angle Θ.

Figure 16:
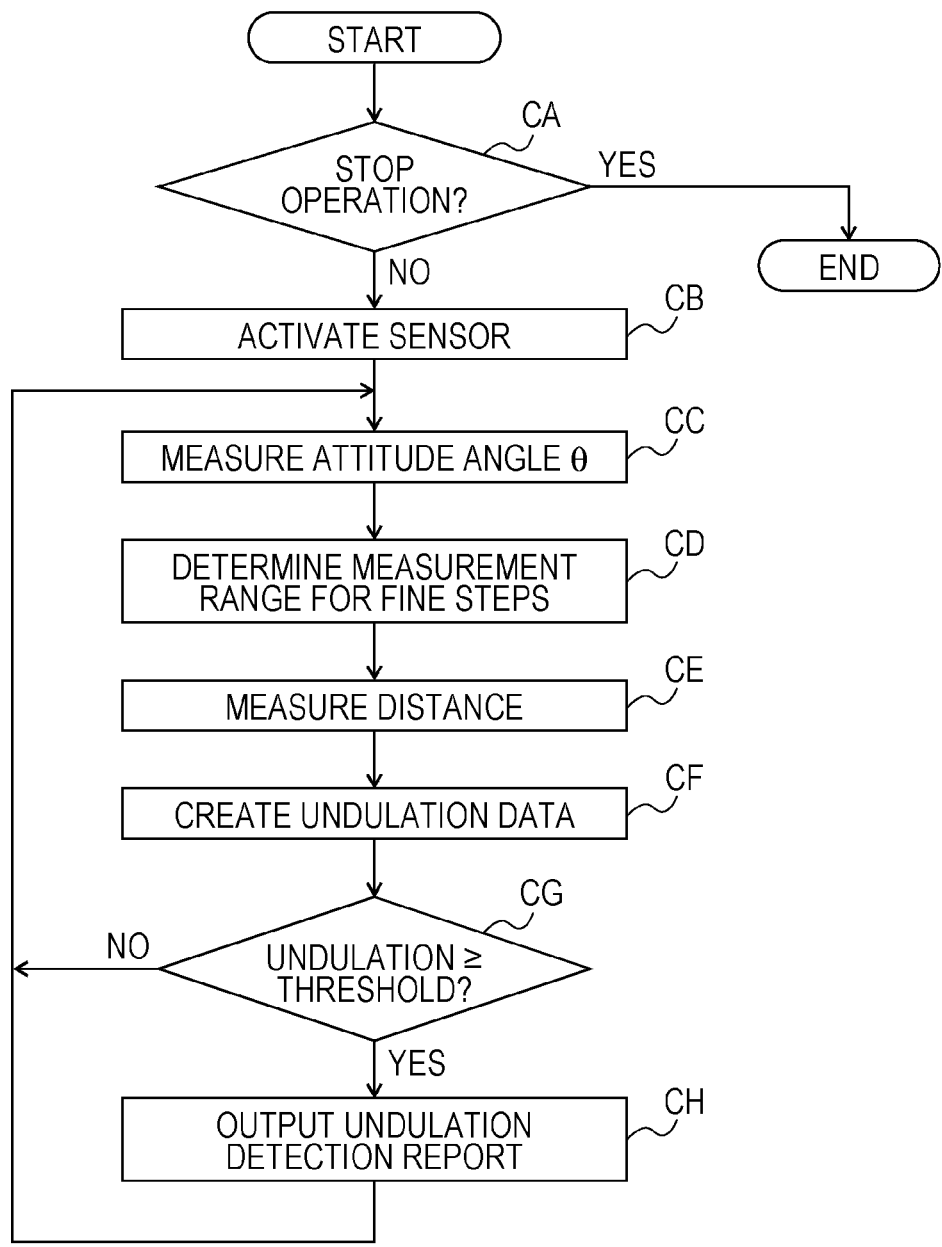
FIG. 16 is a flowchart depicting a third example of the undulation detection process performed by the electronic device.

FIG. 16 is a flowchart depicting a third example of the undulation detection process performed by the electronic device 1. In the flowchart of FIG. 16, Operations CA and CB are the same as Operations AA and AB, respectively, in the flowchart of FIG. 7. At Operation CC, the gyro-sensor 30 measures an attitude angle Θ of the electronic device 1. In operation CD, the undulation detection processor 20 determines lateral and vertical variable ranges over which the emission angles of millimeter waves are varied in fine steps.

In Operation CE, the millimeter wave sensor 18 measures distances to the measurement surface 2 in a plurality of directions forming different lateral and vertical angles with the millimeter wave. In this case, the undulation detection processor 20 drives a millimeter wave sensor 18 so as to emit millimeter waves in fine angle steps within the variable angle range determined in Operation CD and in rough angle steps outside the determined variable angle range. Operations CF to CH are the same as Operations AD to AF, respectively, in the flowchart of FIG. 7.

In the third embodiment, even when the distance measurement region 3 expands in relation to the attitude angle Θ of the electronic device 1, the electronic device 1 suppresses the expansion of a region in which distance measure is made in fine steps. Or the electronic device 1 suppresses the expansion of the distance measurement range 3 itself. With this configuration, the power consumption of the electronic device 1 is decreased. It is to be noted that the third embodiment may be performed in conjunction with one or both of fourth and fifth embodiments that will be described hereinafter.

4. Fourth Embodiment

Next, another embodiment will be described. In the fourth embodiment, before the electronic device 1 detects an undulation, a user measures a holding height of the electronic device 1, and then, the electronic device 1 corrects a depth threshold M and a width threshold N in accordance with the measured height.

A first scenario for correcting a depth threshold M and a width threshold N is to deal with a difference in a foot size of each individual user. Specifically, as a height at which a user is holding the electronic device 1 is greater, the user is more likely to have a greater height and larger feet. Accordingly, when the correction is performed on the basis of the first scenario, the electronic device 1 increases the thresholds in order to increase a lower limit of an undulation size, as the holding height is greater.

A second scenario for correcting a depth threshold M and a width threshold N is to deal with a change in an interval between adjacent measurement points. Specifically, as a height at which a user is holding the electronic device 1 is greater, an interval between adjacent measurement points increases, and a lower limit of an undulation size at which an undulation detection report is outputted increases. Accordingly, when the correction is performed on the basis of the second scenario, the electronic device 1 decreases the thresholds in order to suppress the increase in a lower limit of an undulation size at which an undulation detection report is outputted, as the holding height is greater.

Figure 17:
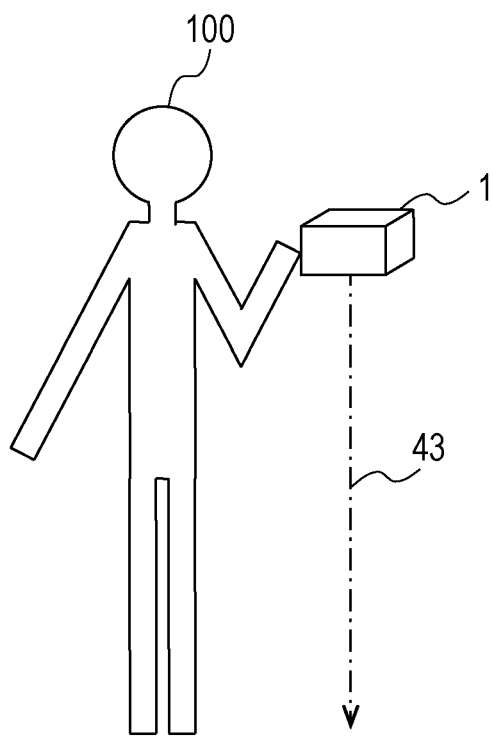
FIG. 17 is a view depicting an example of a process of measuring a holding position of the electronic device.

FIG. 17 is a view depicting an example of a process of measuring a holding position of the electronic device 1. Upon measuring a holding height of the electronic device 1, the user 100 sets an attitude angle Θ of the electronic device 1 to 0 degrees, such that a travel direction of a millimeter wave 43 for use in measuring a height of the electronic device 1 is perpendicular to the measurement surface 2. The electronic device 1 may display, on the display unit 16, a measurement result of the attitude angle Θ obtained by the gyro-sensor 30 during a height measurement process. Alternatively, the electronic device 1 may obtain a measurement result from the millimeter wave sensor 18 when an attitude angle Θ measured by the gyro-sensor 30 is 0 degrees.

FIG. 18 is an explanatory view depicting an example of correcting depth and width thresholds in accordance with the first scenario. In the electronic device 1, correction coefficients CM2 and CN2 are preset in order to correct the depth threshold M and the width threshold N, respectively, in accordance with a measured distance between the measurement surface 2 and the holding height of the electronic device 1. In FIG. 18, the correction coefficient CM2 is 0.8, 0.85 . . . 1.00 . . . 1.20 and 1.25, respectively, when a measured distance is 50 cm, 55 cm . . . 70 cm . . . 90 cm and 95 cm. The correction coefficient CN2 is also set in the similar manner.

The correction coefficients CM2 and CN2 are stored in the auxiliary storage unit 11. The undulation detection processor 20 selects correction coefficients CM2 and CN2 in accordance with the attitude angle Θ measured by the gyro-sensor 30. The undulation detection processor 20 corrects the depth threshold M and the width threshold N by multiplying the thresholds M and N by the selected correction coefficients CM2 and CN2, respectively.

Figure 19:
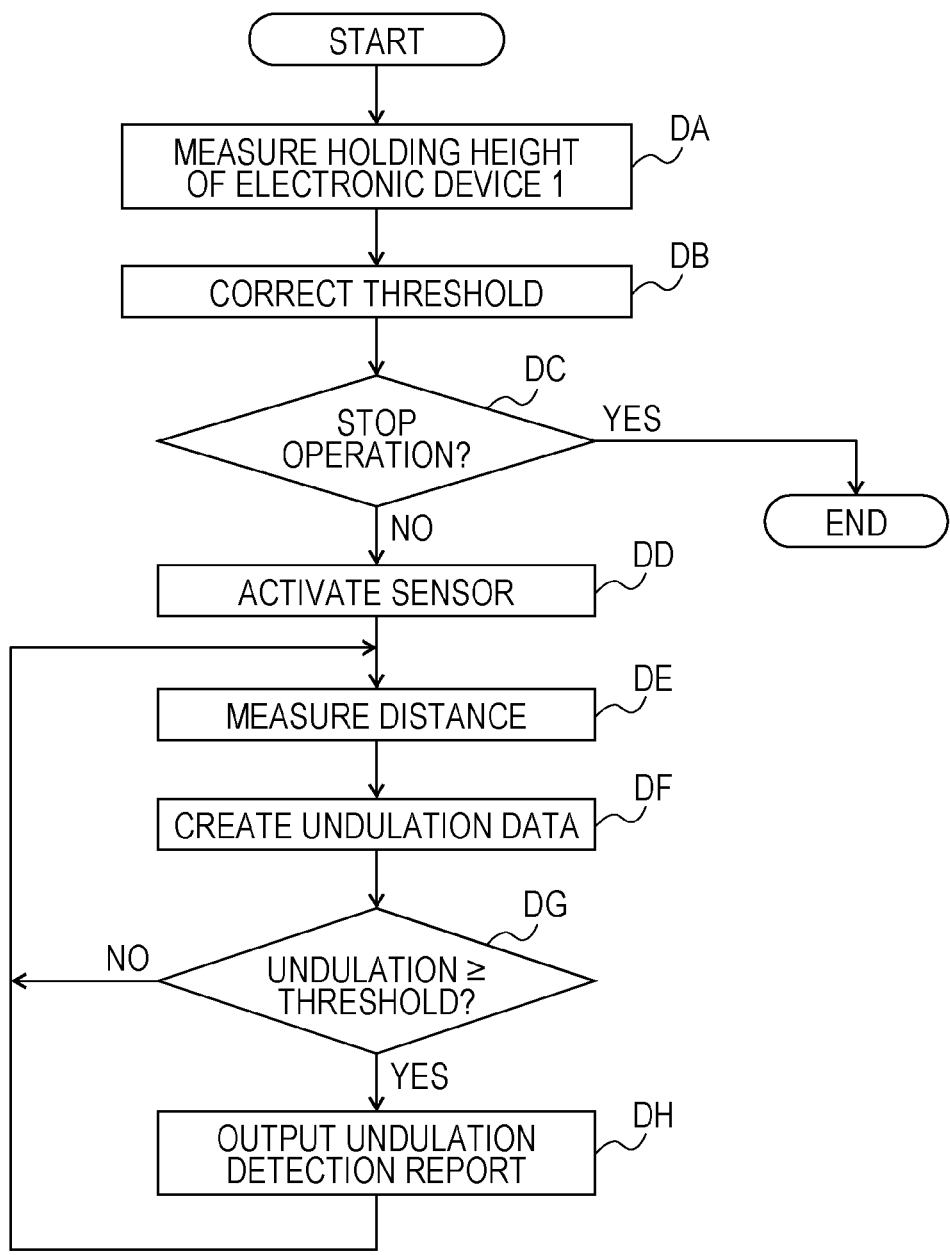
FIG. 19 is a flowchart depicting a fourth example of the undulation detection process performed by the electronic device.

FIG. 19 is a flowchart depicting a fourth example of the undulation detection process performed by the electronic device 1. In Operation DA, the millimeter wave sensor 18 measures a height at which a user is holding the electronic device 1. In operation DB, the undulation detection processor 20 selects correction coefficients in accordance with the holding height of the electronic device 1 measured by the millimeter wave sensor 18. The undulation detection processor 20 corrects the thresholds M and N on the basis of the selected correction coefficients. Operations DC to DH are the same as Operations AA to AF, respectively, in the flowchart of FIG. 7.

With the fourth embodiment, the depth threshold M and the width threshold N are corrected by the electronic device 1, in accordance with a variation in an interval between adjacent measurement points due to a difference in a foot size of each individual user and a holding position of the electronic device 1. It is to be noted that the fourth embodiment may be performed in conjunction with the fifth embodiment that will be described below.

5. Fifth Embodiment

Next, another embodiment will be described. In a fifth embodiment, the electronic device 1 selects a mode of an undulation detection report in accordance with the type of an application program running on the foreground of the display unit 16. For example, the electronic device 1 may change a mode of an undulation detection report in accordance with a real-time property of display crated by each program, namely, the degree of a change in the display with time.

While an application program that does not involve a prominent change in the display with time is running, it is possible for a user to perceive even an undulation detection report with a less dramatic visual impact. For example, while an application program, such as an electric mail, a web browser, or the like, that does not involve a prominent change in the display with time is running, the electronic device 1 may output an undulation detection report with a less dramatic visual impact, such as that changing a color of a wallpaper during a certain period.

Meanwhile, while an application program that involves a prominent change in the display with time is running, the electronic device 1 outputs an undulation detection report with a dramatic visual impact, in order for a user to perceive the undulation detection report. Examples of such an application program include a game, a video replay program, and an image pickup program. While an application program of this type is running on the foreground, the electronic device 1 may output an undulation detection report with a dramatic visual impact, such as that in the form of a dialog box informing a hazard.

Figure 20:
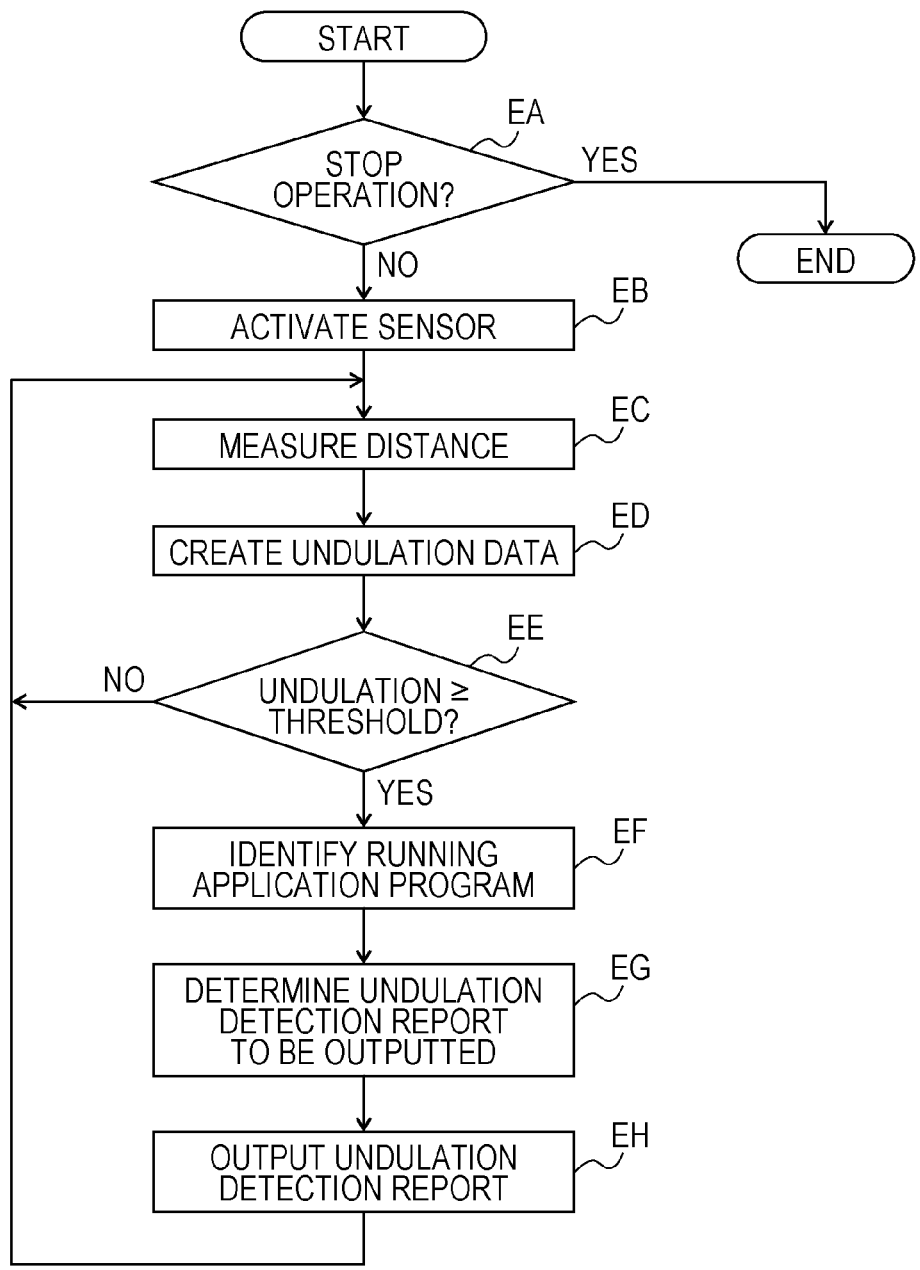
FIG. 20 is a flowchart depicting a fifth example of the undulation detection process performed by the electronic device.

FIG. 20 is a flowchart depicting a fifth example of the undulation detection process performed by the electronic device 1. Operations EA to EE are the same as Operations AA to AE, respectively, in the flowchart of FIG. 7. In Operation EF, the report processor 21 identifies an application program running on the foreground of the display unit 16. In Operation EG, the report processor 21 determines an undulation detection report to be outputted, in accordance with the type of the identified application program. In Operation EH, the electronic device 1 outputs the determined undulation detection report to the display unit 16. Subsequently, the process returns to Operation EC.

With the fifth embodiment, a proper undulation detection report is selected by the electronic device 1, in accordance with the type of an application program running on the foreground of the display unit 16. This configuration makes it possible to reduce a risk that a user overlooks an undulation detection report, while an application program having a high real-time property, namely, involving a prominent change in the display is running.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An undulation detection device comprising:
   a two-dimensional sensor configured to emit a sensing wave for distance measurement in a plurality of directions forming different lateral and vertical angles and to measure respective distances to objects from which the sensing wave is reflected; and
   a processor performs:
   detecting an undulation of a measurement surface or an obstacle placed on the measurement surface from which the sensing wave is reflected, on the basis of a difference among the distances in the different directions, the difference being measured by the two-dimensional sensor; and
   outputting an undulation detection report, when a size of the undulation of the measurement surface or the obstacle placed on the measurement surface is equal to or more than a threshold.

2. The undulation detection device according to claim 1, further comprising an attitude sensor configured to detect an attitude angle of the undulation detection device,
   wherein the processor further includes a correction unit configured to correct the threshold, in accordance with the attitude angle measured by the attitude sensor.

3. The undulation detection device according to claim 2, wherein
- the processor further includes a region changing unit configured to change a first measurement region and a second measurement region, in accordance with the attitude angle measured by the attitude sensor, and
- in the first measurement region, the two-dimensional sensor measures the distances in different directions by respective first steps, and in the second measurement region, the two-dimensional sensor measures the distances in different directions by respective second steps.

4. The undulation detection device according to claim 2, wherein the processor further includes a region changing unit configured to change a measurement region of the two-dimensional sensor, in accordance with the attitude angle measured by the attitude sensor.

5. The undulation detection device according to claim 2, wherein
the processor further includes:
- a distance acquisition unit configured to acquire a distance between the measurement surface and the undulation detection device from the two-dimensional sensor, in a state where the undulation detection device has a predetermined attitude, and
- a correction unit configured to correct the threshold, in accordance with the distance between the undulation detection device and the measurement surface.

6. The undulation detection device according to claim 1, further comprising an attitude sensor configured to detect an attitude angle of the undulation detection device, wherein
- the processor further includes a region changing unit configured to change a first measurement region and a second measurement region, in accordance with the attitude angle measured by the attitude sensor, and
- in the first measurement region, the two-dimensional sensor measures the distances in different directions by respective first steps, and in the second measurement region, the two-dimensional sensor measures the distances in different directions by respective second steps.

7. The undulation detection device according to claim 1, further comprising an attitude sensor configured to detect an attitude angle of the undulation detection device,
wherein the processor further includes a region changing unit configured to change a measurement region of the two-dimensional sensor, in accordance with the attitude angle measured by the attitude sensor.

8. The undulation detection device according to claim 1, wherein the processor further includes a correction unit configured to correct the threshold, in accordance with a distance between the undulation detection device and the measurement surface.

9. The undulation detection device according to claim 8, wherein the processor further includes a distance acquisition unit configured to acquire the distance between the undulation detection device and the measurement surface from the two-dimensional sensor.

10. The undulation detection device according to claim 1, further comprising an attitude sensor configured to detect an attitude angle of the undulation detection device,
wherein the processor further includes:
- a distance acquisition unit configured to acquire a distance between the measurement surface and the undulation detection device from the two-dimensional sensor, in a state where the undulation detection device has a predetermined attitude, and
- a correction unit configured to correct the threshold, in accordance with the distance between the undulation detection device and the measurement surface.

11. The undulation detection device according to claim 1, further comprising a display device, wherein
the processor further includes:
- an identification unit configured to identify an application program that is being executed on the foreground of the display device by the processor; and
- a determination unit configured to determine the undulation detection report to be outputted, in accordance with the determined application program.

12. A method of detecting an undulation performed by an electronic device equipped with a two-dimensional sensor configured to emit a sensing wave for distance measurement in a plurality of directions forming different lateral and vertical angles and to measure respective distances to objects from which the sensing wave is reflected, the method comprising:
- measuring respective distances to a plurality of points on a measurement surface by using the two-dimensional sensor;
- detecting, by using a processor provided in the electronic device, an undulation of the measurement surface or an obstacle placed on the measurement surface, on the basis of a difference among the distances in the different directions, the difference being measured by the two-dimensional sensor; and
- outputting, by using the processor, an undulation detection report, when a size of the undulation of the measurement surface or the obstacle placed on the measurement surface is equal to or more than a threshold.

* * * * *